United States Patent
Zhao et al.

(10) Patent No.: US 11,664,964 B2
(45) Date of Patent: May 30, 2023

(54) PIM MODEL ADAPTATION

(71) Applicant: XILINX, INC., San Jose, CA (US)

(72) Inventors: Hongzhi Zhao, Los Gatos, CA (US); Christophe Erdmann, Nice (FR)

(73) Assignee: XILINX, INC., San Jose, CA (US)

( * ) Notice: Subject to any disclaimer, the term of this patent is extended or adjusted under 35 U.S.C. 154(b) by 63 days.

(21) Appl. No.: 17/488,112

(22) Filed: Sep. 28, 2021

(65) Prior Publication Data
US 2023/0094315 A1 Mar. 30, 2023

(51) Int. Cl.
*H04L 5/14* (2006.01)
*H04B 1/00* (2006.01)
*H04L 27/26* (2006.01)

(52) U.S. Cl.
CPC ......... *H04L 5/1461* (2013.01); *H04B 1/0057* (2013.01); *H04B 1/0067* (2013.01); *H04L 27/2607* (2013.01)

(58) Field of Classification Search
None
See application file for complete search history.

(56) References Cited

U.S. PATENT DOCUMENTS

| | | | | |
|---|---|---|---|---|
| 10,812,166 B2 * | 10/2020 | Kim | ........ | H04L 25/03343 |
| 10,992,326 B1 * | 4/2021 | Megretski | ........ | H04B 1/0475 |
| 11,025,464 B1 * | 6/2021 | Chen | ........ | H04B 1/04 |
| 11,057,004 B2 * | 7/2021 | Kim | ........ | H03F 3/24 |
| 2005/0129136 A1 * | 6/2005 | Fujii | ........ | H04L 25/03019 |
| | | | | 375/260 |
| 2009/0180559 A1 * | 7/2009 | Hsu | ........ | H04L 27/2647 |
| | | | | 375/346 |
| 2011/0075754 A1 * | 3/2011 | Smith | ........ | H04B 1/109 |
| | | | | 375/296 |
| 2012/0295558 A1 * | 11/2012 | Wang | ........ | H04B 1/123 |
| | | | | 455/79 |
| 2014/0036736 A1 * | 2/2014 | Wyville | ........ | H04B 1/525 |
| | | | | 370/278 |

(Continued)

FOREIGN PATENT DOCUMENTS

WO 2020204772 A1 10/2020

OTHER PUBLICATIONS

Liang, Bizheng, "A Novel RTRLNN Model for Passive Intermodulation Cancellation in Satellite Communications", 2018 14th International Wireless Communications and Mobile Computing Conference (IWCMC), IEEE, Jun. 25, 2018.

(Continued)

*Primary Examiner* — Andrew C Oh
(74) *Attorney, Agent, or Firm* — Patterson + Sheridan, LLP (57) ABSTRACT

Embodiments herein describe adapting a PIM model to compensate for changing PIM interference. A PIM model can include circuitry that generates a PIM compensation value that compensates for (i.e., mitigates or subtracts) PIM interference caused by transmitting two or more transmitter (TX) carriers in the same path. The disclosed adaptive scheme generates updated coefficients for the PIM model which are calculated after the RX signal has been removed from the RX channel. In this manner, as the PIM interference changes due to environmental conditions (e.g., temperature at the base station), the adaptive scheme can update the PIM model to generate a PIM compensation value that cancels the PIM interference.

20 Claims, 6 Drawing Sheets

(56) References Cited

U.S. PATENT DOCUMENTS

| | | | | |
|---|---|---|---|---|
| 2014/0266962 A1* | 9/2014 | Dupuy | ................... | H03D 7/165 |
| | | | | 333/125 |
| 2014/0294120 A1* | 10/2014 | Gandhi | ................ | H03F 1/0288 |
| | | | | 330/149 |
| 2016/0352369 A1* | 12/2016 | Smith | ................... | H04B 1/1036 |
| 2018/0139032 A1* | 5/2018 | Ishikawa | ................ | H04B 1/525 |
| 2018/0248572 A1* | 8/2018 | Ishikawa | .............. | H04B 1/0475 |
| 2018/0351588 A1* | 12/2018 | Ohta | ................... | H04B 1/0064 |
| 2019/0007078 A1* | 1/2019 | Tsui | ..................... | H04B 1/0466 |
| 2021/0160719 A1* | 5/2021 | Winter | ................. | H04B 17/345 |
| 2021/0175983 A1* | 6/2021 | Gopalan | ................ | H04B 17/19 |

OTHER PUBLICATIONS

Chen, Fan, "Passive Inter-modulation Cancellation in FDD System," Master's Thesis, Department of Electrical and Information Technology, Lund University, Mar. 2017, 55 pages, http://lup.lub.lu.se/student-papers/record/8917317.

* cited by examiner

PIM MODEL ADAPTATION

TECHNICAL FIELD

Examples of the present disclosure generally relate to adapting a passive intermodulation (PIM) model to compensate for changing PIM interference.

BACKGROUND

PIM is a growing issue for cellular network operators. PIM issues may occur as existing equipment ages, when co-locating new carriers, or when installing new equipment, PIM is a particular issue when overlaying (duplexing) new carriers into old antenna runs.

PIM can create interference that reduces a cell's receive sensitivity or even block calls. This interference can affect both the cell that creates it, as well as other nearby receivers. In cell communication systems, PIM can create interference and reduce receiver sensitivity. For example, in LTE, if two transmitter carriers transmitting from a base station system experience PIM interference, their intermodulation can lead to a component that falls into the receive band. This will affect the receiver as well potentially other systems.

As the spectrum has become more crowded and antenna sharing schemes become more common, there is a corresponding increase in the possibility of PIM interference from the intermodulation of different carriers. The traditional way of using frequency planning to avoid PIM becomes almost impossible.

SUMMARY

One embodiment describes a circuit that includes a data copy identifier circuit configured to identify two copies of the same received data in a receive (RX) wireless channel, a passive intermodulation (PIM) model adapt circuit configured to generate updated values for a PIM model circuit based on the two copies of the same received data. Moreover, the PIM model circuit is configured to generate, for the RX wireless channel, a PIM compensation signal based on the updated values.

Another embodiment described herein is a base station that includes circuitry configured to identify two copies of the same received data in a receive (RX) wireless channel, generate updated values for a PIM model based on the two copies of the same received data, and generate, for the RX wireless channel, a PIM compensation signal based on the updated values for the PIM model.

Another embodiment described herein is a method that includes identifying two copies of the same received data in a receive (RX) wireless channel, generating updated values for a passive intermodulation (PIM) model based on the two copies of the same received data, and generating, for the RX wireless channel, a PIM compensation signal based on the updated values for the PIM model.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe adapting a PIM model to compensate for changing PIM interference. A PIM model can include circuitry that generates a PIM compensation value that compensates for (i.e., mitigates or cancels) PIM interference caused by transmitting two or more transmitter (TX) carriers in the same path. As mentioned above, PIM interference can negatively affect a receive (RX) channel that shares a path with the TX carriers. The PIM model generates a PIM compensation value that negates or cancels PIM interference so that the PIM interference is removed from the RX channel.

However, the effectiveness of the PIM model drops precipitously when the power of PIM interference is the same as, or less than, the power of the RX signal. In that case, the RX signal acts like noise that drowns out the PIM interference and makes it hard, if not impossible, for the PIM model to generate a PIM compensation value to cancel the PIM interference. In the embodiments below, an adaptive PIM model scheme is used to identify and remove the RX signal. In one embodiment, this adaptive scheme generates updated values (e.g., updated coefficients) for the PIM model which are calculated after the RX signal has been removed from the RX channel. Thus, when the PIM interference is equal to or less than the RX signal, the PIM model can still output a PIM compensation value that is essentially equal to, but opposite in magnitude, as the PIM interference. In this manner, as the PIM interference changes due to environmental conditions (ext., temperature at the base station), the adaptive scheme can continually update the PIM model to generate a PIM compensation value that cancels the PIM interference, regardless whether the PIM interference is greater than, or less than, the RX signal.

Figure 1:
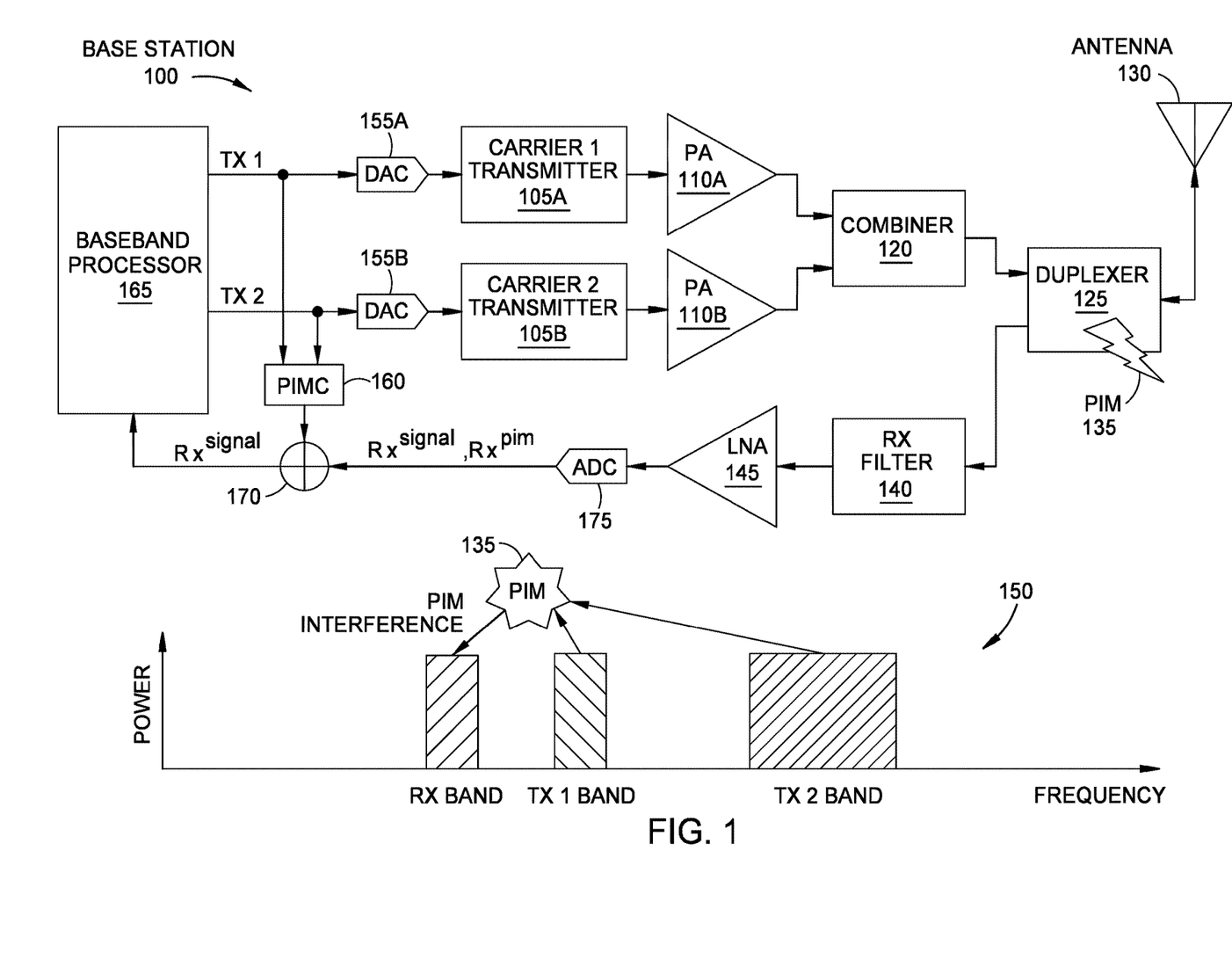
FIG. 1 is a block diagram of a base station that experiences PIM, according to an example.

FIG. 1 is a block diagram of a base station 100 that experiences PIM interference 135, according to an example. To save space and hardware costs, the base station 100 is a carrier aggregation system where multiple carrier transmitters 105 share the same TX channel. In this case, the transmitters 105 and power amplifiers (PA) 110 generate signals at different frequencies—e.g., 1940 MHz and 1980 MHz for LTE—which are then combined into the same TX channel by a combiner 120. In one embodiment, the base station 100 may use frequency division duplex (FDD) to transmit and receive data with wireless devices (not shown). The base station 100 includes a baseband processor 165 and digital to analog converters (DACs) 155A and 155B to generate the different frequencies.

The base station 100 also includes a duplexer 125 that merges the TX channel (which includes both of the TX signals or carriers) with a RX channel. Thus, the base station 100 can use the antenna 130 to both transmit and receive signals. When receiving signals, the duplexer 125 ensures the RX signals are forwarded to an RX filter 140. That is, the duplexer 125 removes the RX signals from the shared TX/RX path after being received at the antenna 130, and forwards the RX signals to the RX filter 140.

Because the RX signals typically have much small amplitudes than the TX signals, a low-noise amplifier (LNA) 145 boosts the RX signals before they are transmitted to the baseband processor 165 for processing.

As shown, the duplexed TX signals create PIM interference 135 that has a negative impact of the RX band. This is illustrated in the chart 150 which shows two TX signals (TX 1 band and TX 2 band) creating PIM interference 135 that affects the RX signal (RX band). Due to the low amplitude of the RX signals, the PIM interference 135 can drown out the RX signal before it can be filtered and amplified by the RX filter 140 and the LNA 145. The embodiments below discuss techniques for performing adaptive PIM modeling to remove the PIM interference generated by the duplexed TX signals using a PIM controller (160). As shown, the PIMC 160 is disposed between the TX and RX paths. The PIMC 160 generates a PIM compensation signal for reducing or mitigating the PIM interference. The PIMC 160 outputs this signal to an adder circuit 170 that is in turn connect to an analog to digital converter (ADC) 175 and the baseband processor 165 in the RX path.

Further, while FIG. 1 illustrates combining two TX signals, PIM interference 135 can occur when combining any number of TX signals (e.g., three, four, ten, etc.) which can then negatively impact an RX signal that shares the same channel or path as the TX signals—e.g., the radio frequency (RF) channel or path between the duplexer 125 and the antenna 130. Further, while the chart 150 illustrates the RX and TX bands as having a similar power, in actuality the power of the TX bands may be much larger than the power of the RX band at the base station 100.

Figure 2:
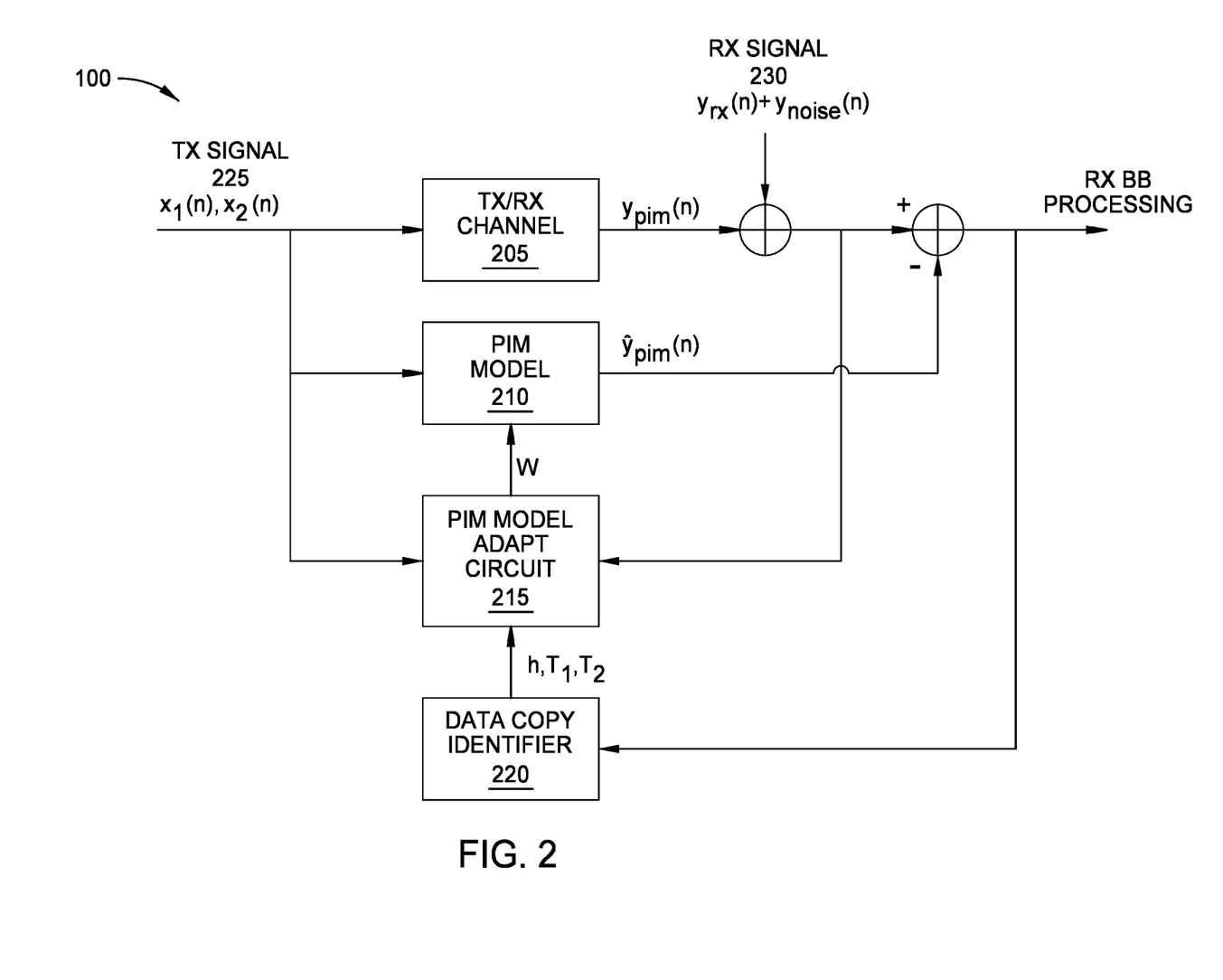
FIG. 2 is a block diagram of a base station that performs PIM model adaptation, according to an example.

FIG. 2 is a block diagram of a base station 100 that performs PIM model adaptation in a digital domain, according to an example, As shown, TX signals 225 received at the left include multiband transmit data $x_1(n)$ and $x_2(n)$. As shown in FIG. 1, the TX signals 225 may be digital baseband signals which are transmitted by TX1 and TX 2 analog RF signals, The amplified TX1 and TX2 signals are received by the combiner 120 which combines two or more TX signals in multiband transmit data.

The TX signals 225 are transmitted on a shared TX/RX channel 205 which creates PIM interference $y_{pim}(n)$ that is added to the RX signal 230. That is, the PIM interference $y_{pim}(n)$ adds noise to the RX signal 230. Further, FIG. 2 illustrates that the RX signal 230 can include both the RX data $y_{rx}(n)$ plus $y_{noise}(n)$ which may be interference from other sources (e.g., thermal noise) besides the PIM interference $y_{pim}(n)$. Put differently, the PIM interference $y_{pim}(n)$ represents PIM non-linear interference in the RX band, while $y_{noise}(n)$ represents noise in the RX band from other sources. The $y_{rx}(n)+y_{noise}(n)+y_{pim}(n)$ is the digital output of the receiver ADC.

To negate the PIM interference, the base station 100 includes a PIM model circuit 210 that outputs a PIM compensation value $\hat{y}_{pim}(n)$ which, ideally, is a signal that, when subtracted from the RX band, cancels out or removes the PIM interference $y_{pim}(n)$. In one embodiment, the PIM compensation value $\hat{y}_{pim}(n)$ is equal to, but opposite in magnitude from the PIM interference $y_{pim}(n)$ so that when the PIM compensation value $\hat{y}_{pim}(n)$ is added to the RX band, PIM interference is removed.

However, as discussed above, the PIM interference can change according to the environmental conditions at the base station 100 (e.g., changes in temperature). Further, when the PIM interference has a magnitude that is equal to or less than the RX data $y_{rx}(n)$, the RX data can act like a noise signal that prevents the PIM model 210 from accurately calculating PIM compensation value $\hat{y}_{pim}(n)$. Thus, instead of having a static PIM model 210 that uses fixed coefficients to generate the PIM compensation value $\hat{y}_{pim}(n)$, FIG. 2 illustrates an adaptive PIM compensation scheme where a PIM model adapt circuit 215 and a data copy identifier circuit 220 generate adaptive coefficients (W) to update the PIM model 210 as the PIM interference changes due to changing environmental conditions at the base station 100. While the embodiments below discuss updating the coefficients for the PIM model 210, the adaptive PIM scheme can be used to update any value that adapts the PIM model 210 to compensate for changing PIM interference.

In this embodiment, the data copy identifier 220 identifies two different time periods $T_1$ and $T_2$ where the RX data $y_{rx}(n)$ has the same value (or opposite values). As discussed in more detail below, the advantage of determining updated coefficients W at two time periods when the RX data is the same is that the RX data can be cancelled from the calculation, thereby resulting in updated coefficients W that are independent of the RX data. Stated differently, because the RX data can be thought of noise when measuring the PIM interference, removing the RX data permits the base station 100 to more accurately measure the PIM interference, and as a result, generate updated coefficients W that result in a PIM compensation value $\hat{y}_{pim}(n)$ that more accurately matches or models the PIM interference $y_{pim}(n)$.

As shown, the data copy identifier 220 includes circuitry that identifies two time periods $T_1$ and $T_2$ where the RX data is the same. The PIM model adapt circuit 215 includes circuitry for sampling the signal (i.e., $_{pim}(n)+y_{rx}(n)+y_{noise}(n)$) at those time periods to generate the updated coefficients W. Because the RX data is essentially removed from the calculation performed by the PIM model adapt circuit 215, the PIM model 210 can generate a PIM compensation value $\hat{y}_{pim}(n)$ that more accurately matches or models the PIM interference $y_{pim}(n)$, regardless whether the amplitude of the PIM interference $y_{pim}(n)$ is greater than, or less than, the magnitude of the RX data $y_{rx}(n)$.

Figure 3:
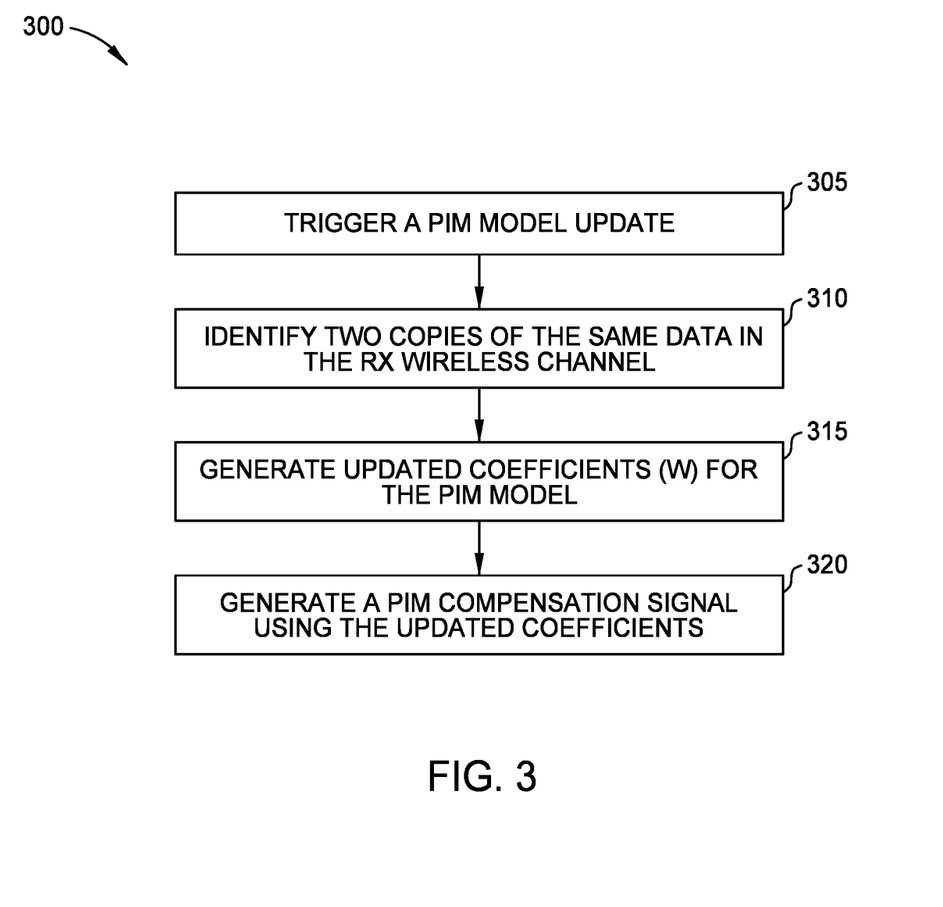
FIG. 3 is a flowchart for performing PIM model adaptation, according to an example.

FIG. 3 is a flowchart of a method 300 for performing PIM model adaptation, according to an example. At block 305, the base station triggers a PIM model update. In one embodiment, a PIM model update is triggered according to a predefined schedule or time interval. For example, the base station may update the PIM model every five minutes. In another embodiment, the update may be based on historical changes in environment conditions. For example, the base station may update the model in the early morning (when temperatures are generally the coolest), at noon when temperatures have risen, and at dusk when temperatures generally decrease.

In another embodiment, the base station triggers a PIM model update as it monitors current weather conditions. For example, the base station may update the PIM model whenever the temperature at the base station changes more than two degrees.

At block 310, the data copy identifier (e.g., the identifier 220 in FIG. 2) identifies two copies of the same data in the RX wireless channel. As mentioned above, sampling the RX channel when the RX data is the same allows the PIM adaptive scheme to cancel out or remove the effects of the RX data. The following equations represent the problem when PIM interference is similar to, or less than, the power of the received data. Equation 1 represents the digital signal processing associated with the RX channel $$\Sigma^{K}_{k=1} w_k f_k(\vec{x}_1, \vec{x}_2) = y_{pim}(n) + y_{rx}(n) + y_{noise}(n) \quad (1)$$

where $f_k$ is the PIM model nonlinear base function.
The signal to noise ratio (SNR) of Equation 1 is:

$$SNR = \frac{P_{pim}}{P_{rx} + P_{noise}} \triangleq \frac{P_{pim}}{P_{rx}} \quad (2)$$

where $P_{pim}$ is PIM average power, $P_{rx}$ is the receive signal average power, and $P_{noise}$ is the thermal noise average power. Moreover, $P_{noise} \ll P_{rx}$. Further, $\vec{x}_1$ and $\vec{x}_2$ can be defined as:

$$\vec{x}_1 = [x_1(n), x_1(n-1), x_1(n-2), \ldots x_1(n-M+1)]^T \quad (3)$$

$$\vec{x}_2 = [x_2(n), x_2(n-1), x_2(n-2), \ldots x_2(n-M+1)]^T \quad (4)$$

The SNR of the PIM adapt processing in Equation 1 is smaller than 0 (dB) when receive power $P_{rx}$ is greater than PIM power $P_{pim}$. For example, where the receive power is 6.8 dB higher than PIM power, the uplink can still use BPSK/QPSK modulations. But when the PIM processing SNR is −6.8 dB, the PIM mod& cannot model the PIM accurately and remove it from the receive signal for uplink using 16 QAM or 64 QAM modulation. This limits the uplink data throughput.

A digital PIM adapt equation for accurately modeling the PIM, regardless of the relationship between the receive power and the PIM power, is shown in Equation 5.

$$U_{pim} * W = Y_{pim} + Y_{rx} + Y_{noise} \quad (5)$$

Where $U_{pim} = [f_1, f_2, \ldots, f_K]$ and $W = [w_1, w_2, \ldots, w_K]^K$ and $Y_{pim}, Y_{rx}$, and $Y_{noise}$ stand for N samples of $y_{pim}(n), y_{rx}(n), y_{noise}(n)$. The PIM model coefficients are:

$$W = (U^H_{pim} U_{pim})^{-1} (U^H_{pim}(Y_{pim} + Y_{rx} + Y_{noise})) \quad (6)$$

Equation 6 illustrates that the coefficients for the PIM model are dependent on the RX data $Y_{rx}$. To remove this dependency, the data copy identifier identifies two copies of the same RX data. Specifically, in one embodiment, the data copy identifier identifies two times periods ($T_1$ and $T_2$) where the RX data is the same. Equations 7 and 8 illustrate the PIM adapt model at those two time periods.

$$U_{pim}(tx(T_1)) * W = Y_{pim}(T_1) + Y_{rx}(T_1) + Y_{noise}(T_1) \quad (7)$$

$$U_{pim}(tx(T_2)) * W = Y_{pim}(T_2) + Y_{rx}(T_2) + Y_{noise}(T_2) \quad (8)$$

Because the RX data is the same, this means $Y_{rx}(T_1) \triangleq Y_{rx}(T_2)$. As a result, when the Equations 7 and 8 are subtracted, the result is a PIM adapt model that is independent of the receive data:

$$[U_{pim}(tx(T_1)) - U_{pim}(tx(T_2))] * W = [Y_{pim}(T_1) - Y_{pim}(T_2)] + [Y_{noise}(T_1) - Y_{noise}(T_2)] \quad (9)$$

In Equation 9, the SNR of the PIM adapt processing is simply the ratio of $P_{pim}$ and $P_{noise}$, in contrast to Equation 2 where the SNR for PIM (non-adaptive) processing is dependent on $P_{rx}$.

The U matrixes of transmitting data samples at time interval of $T_1$ and $T_2$ are orthogonal. Also, assuming the transmit power and the thermal noise power at $T_1$ and $T_2$ are the same, Equation 9 can be expressed as:

$$[U^H_{pim}(tx(T_1)) U^H_{pim}(tx(T_2))] \begin{bmatrix} U_{pim}(tx(T_1)) \\ U_{pim}(tx(T_2)) \end{bmatrix} \quad (10)$$

$$\triangleq [U^H_{pim}(tx(T_1)) U^H_{pim}(tx(T_2))] \begin{bmatrix} Y_{pim}(T_1) \\ Y_{pim}(T_2) \end{bmatrix}$$

Equation 10 can be simplified as the following, which is an uplink data free equation that is not dependent on the received data:

$$U_{pim}(tx(T_1 + T_2)) * W \triangleq Y_{pim}(T_1 + T_2) \quad (11)$$

At block 315, a PIM model adapt circuit (e.g., the circuit 215 in FIG. 2) generates updated coefficients (W) for the PIM model. That is, the PIM model adapt circuit can use Equation 11 to solve for the coefficients W that are then used to adapt the PIM model (e.g., the PIM model 210). That is, the coefficients can be used in the digital signal processing represented in Equation 1 that includes the PIM model nonlinear base function.

At block 320, the PIM model generates a PIM compensation signal $\hat{y}_{pim}(n)$ using the updated coefficients W. This signal can then be added (or subtracted) from the RX signal (e.g., RX signal 230 in FIG. 2) to remove PIM interference before the RX signal is transmitted to the baseband processor for further processing. In this manner, the adapt circuit in the method 300 can remove PIM interference regardless of its relative power to the RX data.

Figure 4:
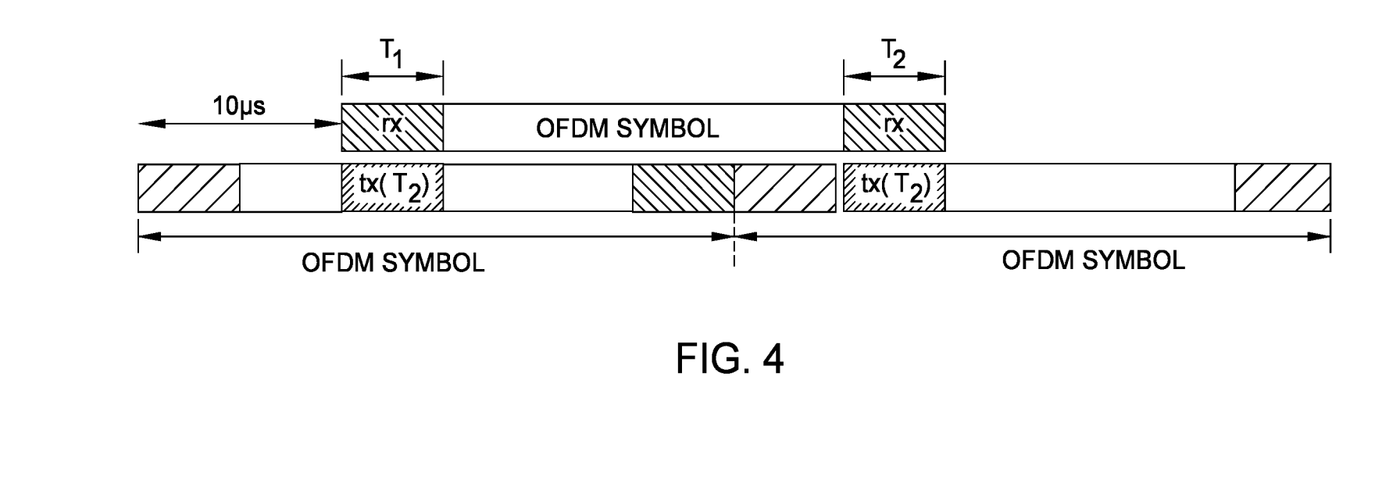
FIG. 4 illustrates an OFDM symbol, according to an example.

FIG. 4 illustrates an OFDM symbol, according to an example. As mentioned in the method 300, at block 310 the data copy identifier identifies two copies of the same RX data in the RX channel. FIG. 4 illustrates identifying the same copy of data in an Orthogonal Frequency Division Multiplexing (OFDM) symbol, which are the cyclic prefix (CP) and its corresponding part of data at the end of an OFDM symbol. While this Figure illustrates identifying the same data in an OFDM symbol, the embodiments herein can be applied to any wireless scheme where a data symbol includes redundant copies of the same data.

The top of FIG. 4 illustrates an uplink (UL) OFDM symbol while the bottom illustrates two downlink (DL) OFDM symbols. In this example, the RX portions of the top UL OFDM symbol have the same data. Thus, the data copy identifier can identify the times $T_1$ and $T_2$ there RX portions of the OFDM symbol are received so that the PIM model adapt circuit can generate updated coefficients using the data received at those times as discussed at block 315 of the method 300.

The bottom DL OFDM symbols illustrate the portions $tx(T_1)$ and $tx(T_2)$ of the DL OFDM symbols that correspond to the RX portions of the top OFDM symbol. The data during the $tx(T_1)$ and $tx(T_2)$ portions are likely not the same and thus, can be used to identify PIM interference using the equations above (e.g., using Equation 11 which relies on the transmitted data "tx" at $T_1$ $T_2$). That is, the $tx(T_1)$ and $tx(T_2)$ portions are independent. Further, the UL and DL OFDM signals are separated by a delay (10 microseconds) which ensures the portions $tx(T_1)$ and $tx(T_2)$ are not the same as the RX portions in the top UL OFDM symbol.

In one embodiment, the RX portions of the UL OFDM symbols are part of the cyclic prefix (CP) of the OFDM signal. A wireless standard may require these portions of the CP to be the same. Thus, the data copy identifier can leverage this requirement of the standard to identify the RX portions, knowing these portions have the same underlying data, and thus, can be used to remove the receive power from the PIM adaption algorithm, In one embodiment, the data copy identifier includes an equalizer to equalize the uplink cyclic prefix (UL CP) and its corresponding data. An equalizer function (h) can be expressed as:

$$h*Y_{rx}(T_2)=Y_{rx}(T_1) \tag{12}$$

$$U(tx(T_1))*W=Y_{pim}(T_1)+Y_{rx}(T_1)+Y_{noise}(T_1) \tag{13}$$

$$\{h*U(tx(T_2))\}*W=h*Y_{pim}(T_2)+h*Y_{rx}(T_2)+h*Y_{noise}(T_2) \tag{14}$$

$$[U(tx(T_1))-h*U(tx(T_2))]*W=[Y_{pim}(T_1)-h*Y_{pim}(T_2)]+ \\ [Y_{noise}(T_1)-h* Y_{pim}(T_2)] \tag{15}$$

Figure 5:
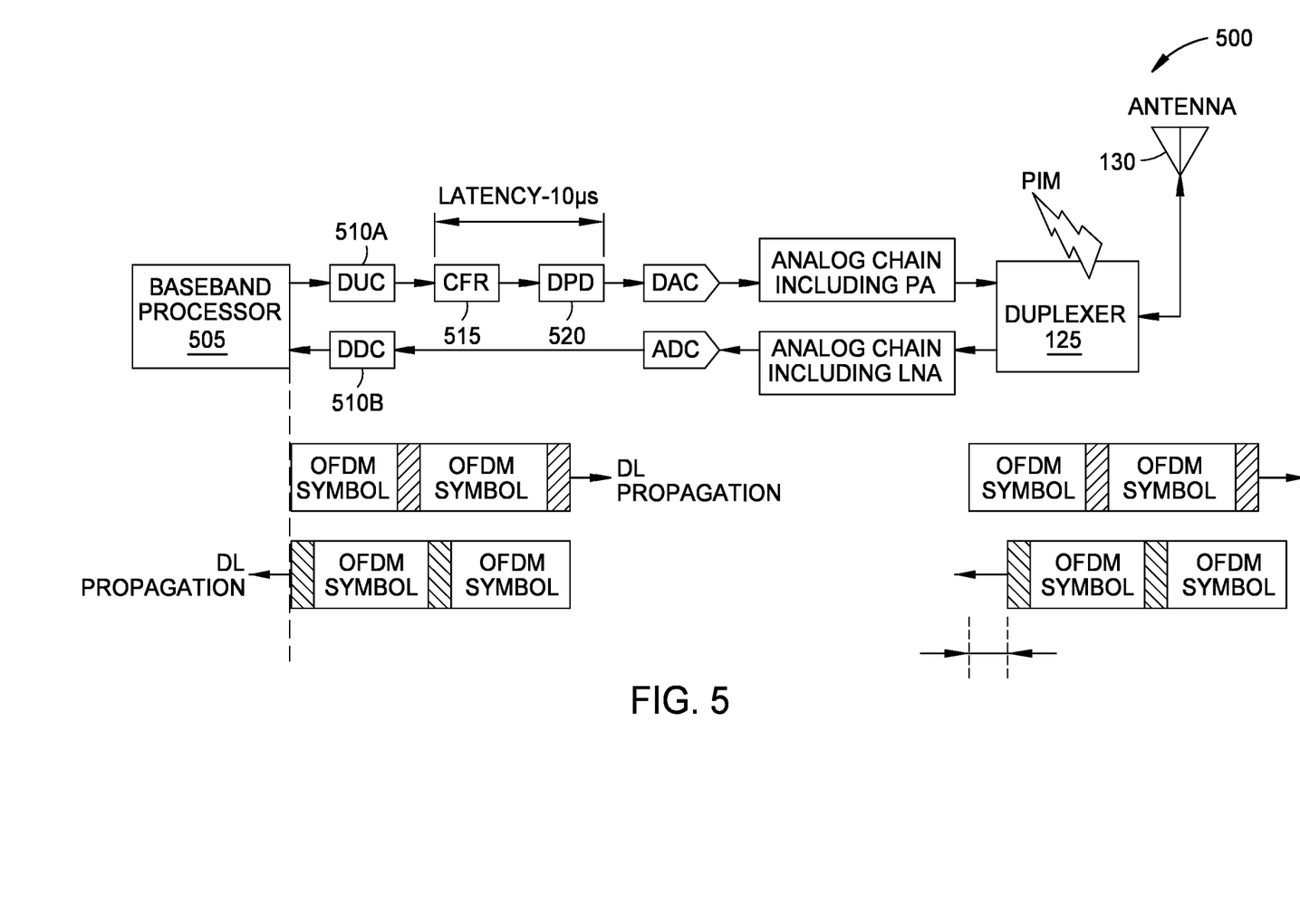
FIG. 5 illustrates latencies in a base station, according to an example.

FIG. 5 illustrates latencies in a base station, according to an example. FIG. 5 illustrates the analog path latency (delay) between the DL and UL in the base station. FIG. 5 illustrates a baseband processor 505 for processing the DL and UL data. In this example, both the DL and UL paths in the base station 500 include a digital up conversion (DUC) circuit 510. However, in addition to this circuit, the DL path includes a crest factor reduction (CFR) circuit 515 and a digital predistortion (DPD) circuit 520. These additional circuits mainly contribute to the delay (e.g., 10 microseconds) between the UL and DL paths. This delay causes the delay between the UL and DL OFDM symbols illustrated in FIG. 4.

Figure 6:
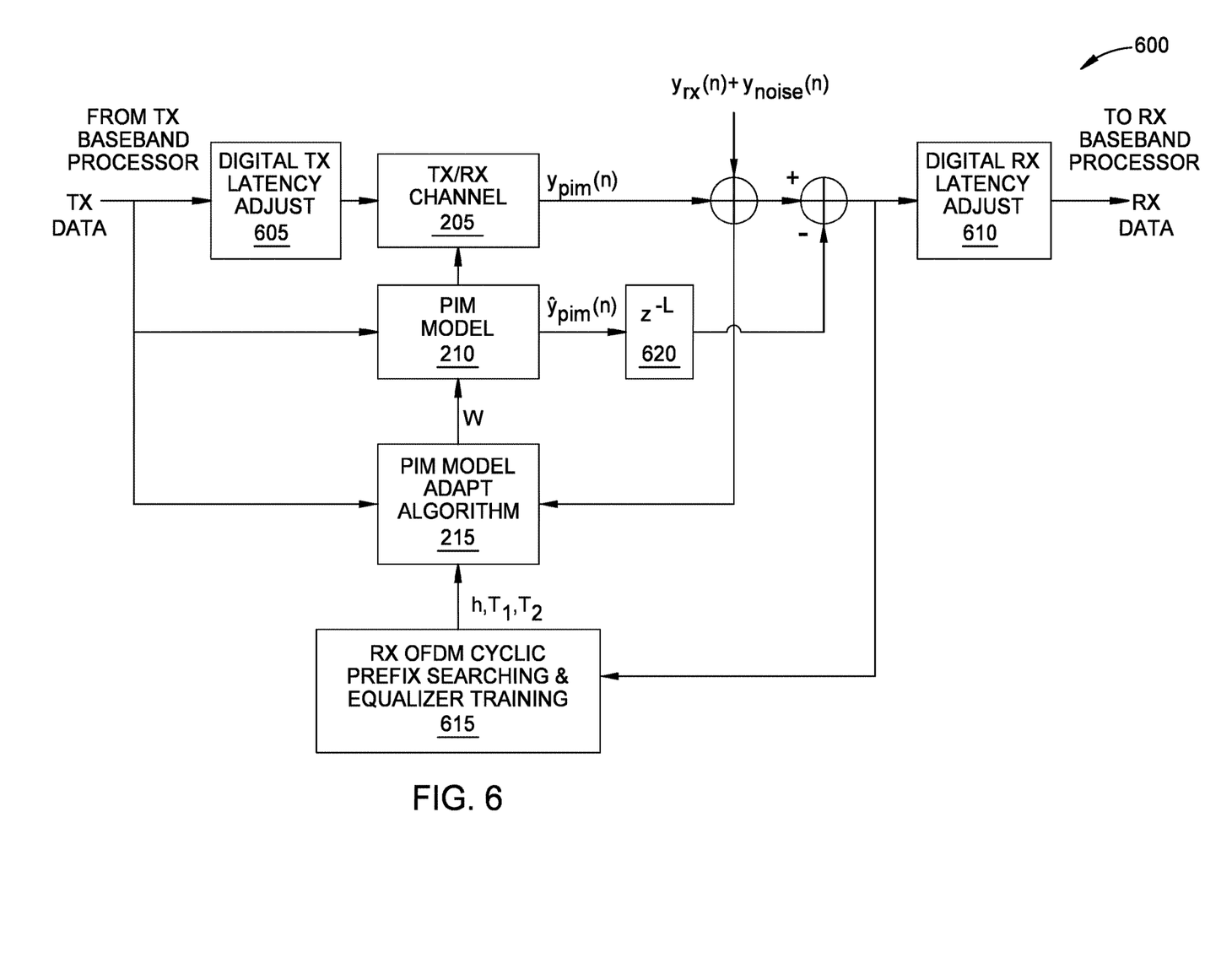
FIG. 6 is a block diagram of a base station that experiences PIM, according to an example.

FIG. 6 is a block diagram of a base station 600 that experiences PIM, according to an example. The base station 600 includes many of the same circuitry as the base station 200 in FIG. 2, which are not discussed here. In addition, the base station 600 includes digital TX latency adjust circuitry 605, digital RX latency adjust circuitry 610, and a RX OFDM CP searching and equalization training circuitry 615. This circuitry can be used to perform equalization as discussed in equations 12-15 above. That is, the circuitry 615 can both identify copies of the same data in the CP portions of the OFDM symbol as well as perform an equalization on the underlying data in those portions.

The base station 600 also includes a gain circuit 620 that is used to align the PIM modeling signal $\hat{y}_{pim}(n)$ and the received PIM interference signal $y_{pim}(n)$. For example as shown in FIG. 1, the delay is the time for tx signals to propagate from DAC to the duplexer along the tx paths, to generate PIM signals, and the PIM signals to propagate to the PIMC circuits along the RX path.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A circuit, comprising:
   a data copy identifier circuit configured to identify two copies of the same received data in a receive (RX) wireless channel; and
   a passive intermodulation (PIM) model adapt circuit configured to generate updated values for a PIM model circuit based on the two copies of the same received data,
   wherein the PIM model circuit is configured to generate, for the RX wireless channel, a PIM compensation signal based on the updated values.

2. The circuit of claim 1, further comprising:
   a duplexer or combiner configured to duplex or combine multiple transmit (TX) carriers with a same path as the RX wireless channel, wherein the PIM compensation signal mitigates PIM interference injected into the RX wireless channel by the multiple TX carriers.

3. The circuit of claim 2, wherein a signal to noise ratio (SNR) of the updated values is dependent on a power corresponding to the PIM interference and a power corresponding to a thermal noise in the RX wireless channel, but is not dependent on a power corresponding to the received data.

4. The circuit of claim 3, wherein the PIM model adapt circuit is configured to use the two copies of the same received data to cancel out an effect the received data has on the updated values so that the SNR is not dependent on the power corresponding to the received data.

5. The circuit of claim 1, wherein the two copies of the same received data comprise two portions of one or more data symbols that have the same received data.

6. The circuit of claim 5, wherein the two portions are part of cyclic prefixes in the one or more data symbols.

7. The circuit of claim 6, wherein the cyclic prefixes are part of Orthogonal Frequency Division Multiplexing (OFDM) symbols.

8. The circuit of claim 6, further comprising:
   an equalizer to equalize the cyclic prefixes and their corresponding received data.

9. A base station, comprising:
   circuitry configured to:
      identify two copies of the same received data in a receive (RX) wireless channel;
      generate updated values for a PIM model based on the two copies of the same received data; and
      generate, for the RX wireless channel, a PIM compensation signal based on the updated values for the PIM model.

10. The base station of claim 9, wherein the circuitry is configured to duplex or combine multiple transmit (TX) carriers with a same path as the RX wireless channel, wherein the PIM compensation signal mitigates PIM interference injected into the RX wireless channel by the multiple TX carriers.

11. The base station of claim 10, wherein a signal-to-noise ratio (SNR) of the updated values is dependent on a power corresponding to the PIM interference and a power corresponding to a thermal noise in the RX wireless channel, but is not dependent on a power corresponding to the received data.

12. The base station of claim 11, wherein the circuitry is configured to use the two copies of the same received data to cancel out an effect the received data has on the updated values so that the SNR is not dependent on the power corresponding to the received data.

13. The base station of claim 9, wherein the two copies of the same received data comprise two portions of one or more data symbols that have the same received data.

14. The base station of claim 13, wherein the two portions are part of cyclic prefixes in the one or more data symbols.

15. The base station of claim 14, wherein the cyclic prefixes are part of Orthogonal Frequency Division Multiplexing (OFDM) symbols.

16. The base station of claim 14, wherein the circuitry is configured to equalize the cyclic prefixes and their corresponding received data.

17. A method, comprising:
- identifying two copies of the same received data in a receive (RX) wireless channel;
- generating updated values for a passive intermodulation (PIM) model based on the two copies of the same received data; and
- generating, for the RX wireless channel, a PIM compensation signal based on the updated values for the PIM model.

18. The method of claim 17, further comprising:
- duplexing multiple transmit (TX) carriers with a same path as the RX wireless channel, wherein the PIM compensation signal mitigates PIM interference injected into the RX wireless channel by the multiple TX carriers.

19. The method of claim 18, wherein a signal-to-noise ratio (SNR) of the updated values is dependent on a power corresponding to the PIM interference and a power corresponding to a thermal noise in the RX wireless channel, but is not dependent on a power corresponding to the received data.

20. The method of claim 19, wherein generate updated values for the PIM model based on the two copies of the same received data comprises:
- using the two copies of the same received data to cancel out an effect the received data has on the updated values so that the SNR is not dependent on the power corresponding to the received data.

* * * * *